United States Patent
Lin

(10) Patent No.: US 6,599,453 B1
(45) Date of Patent: Jul. 29, 2003

(54) BIAXIALLY ORIENTED POLYPROPYLENE FOR PRINTING OF WATER-BASED INKS AND HEAT-SEALING/NON-HEAT-SEALING ELECTROPLATING TREATMENT AND PROCESS THEREOF

(75) Inventor: Allen Fong-Chin Lin, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 321 days.

(21) Appl. No.: 09/666,287

(22) Filed: Sep. 21, 2000

(51) Int. Cl.[7] .............................................. B29C 47/06
(52) U.S. Cl. ............... 264/80; 264/173.14; 264/173.15; 264/210.7; 264/211
(58) Field of Search ........................ 264/80, 469, 211, 264/210.6, 210.7, 173.14, 173.15, 290.2

(56) References Cited

U.S. PATENT DOCUMENTS

| | | | | |
|---|---|---|---|---|
| 5,573,723 A | * | 11/1996 | Peiffer et al. | 264/173.14 |
| 5,792,549 A | * | 8/1998 | Wilkie | 428/215 |
| 5,958,566 A | * | 9/1999 | Wheat et al. | 428/215 |
| 6,001,290 A | * | 12/1999 | Lin | 156/244.17 |
| 6,332,940 B1 | * | 12/2001 | Lin | 156/229 |
| 6,364,988 B1 | * | 4/2002 | Lin | 156/244.17 |
| 6,368,543 B1 | * | 4/2002 | Lin | 264/173.14 |
| 6,379,605 B1 | * | 4/2002 | Lin | 156/229 |
| 6,395,147 B1 | * | 5/2002 | Wheat et al. | 204/192.14 |

* cited by examiner

*Primary Examiner*—Mark Eashoo

(57) ABSTRACT

A process for fabricating biaxially oriented polypropylene to modify the properties of polypropylene through treatment of flame is disclosed. The surface tension and the planarity of the polypropylene films is improved after adjusting the composition of the polypropylene and treating the polypropylene films with flame. The polypropylene products through the treatment process have good lamination strength for water-based inks and good adherence with aluminum foils. The requirements of the process for fabricating the polypropylene is illustrated following:
1. The surface for future printing and electroplating is heated by flame.
2. The flame comes from the combustion of a liquid natural gas which contains more than 85% of methane.
3. The flame has following properties:
   (1) polrization voltage: 0.1–0.8 KV, optimal voltage: 0.2 KV.
   (2) The temperature of cooling cylinders : 20–50° C., optimal temperature 25° C.
   (3) The temperature of flame : 700–900° C., optimal temperature 760° C.

3 Claims, No Drawings

BIAXIALLY ORIENTED POLYPROPYLENE FOR PRINTING OF WATER-BASED INKS AND HEAT-SEALING/NON-HEAT-SEALING ELECTROPLATING TREATMENT AND PROCESS THEREOF

The biaxially oriented polypropylene films are widely applied in industry and commercial markets, especially in the application of packaging. Nevertheless, because of poor adherence between water-based ink or electroplated aluminum foils, the use of biaxially oriented polypropylene films is precluded from the applications where high adherence between water-based ink or electroplating aluminum foils is required.

On the other hand, several advantages can be observed in the application of water-based ink in packaging. For example, the print processing of water-based ink is environment-friendly. No pollution or little pollution is generated when water-based ink is used for print. In addition, it's relative safer to handle water-based inks since they are not combustible. Furthermore, the water-based ink is harmless to human health. These make water-based inks popular in the application on the printing for packaging.

Several advantages can also be found in the application of aluminum foils in packaging. For example, the isolation of aluminum foils from air or moisture is high. This advantage makes aluminum foil a desirable candidate as a material for the packaging of foods. Moreover, the shinning beauty of aluminum foils also makes them popular in the application for packaging, especially for presents.

Since the surface tension of biaxially oriented polypropylene is weak, the only inks for printing on the biaxailly oriented polypropylene films are only oily inks. Because combustible solvents such as toluenes, methyl ethyl ketones and ethyl acetates are required, the print processing of the oily ink on the biaxially oriented polypropylene is potentially dangerous. Besides, the print processing of oily inks on the biaxially oriented polypropylene is also not environment friendly and is harmful to human health, either.

On the other hand, since the adherence and fastness between the biaxially oriented polypropylene and the aluminum foils is very poor it is required to coat layers of adherents between biaxially oriented polypropylene and the aluminum foils before laminating these two materials. Especially for the application of the packaging of foods or presents, formation of layers of adherents is required before the laminates are further electroplated.

The biaxially oriented polypropylene films on which water-based inks can be directly printed, has the advantages of biaxially oriented polypropylene film, water-based inks (or aluminum). Biaxially oriented polypropylene films are widely applied in print processing or electroplated aluminum foils on market. However, although such kinds of biaxially oriented polypropylene films are in demand, they are still not found on market now.

To create a biaxially oriented polypropylene film to meet the requirement that water-based inks can directly print on, we found that the biaxially oriented polypropylene film needs to be modified further. After treatment with special polypropylenes and additives in specific conditions, the biaxially oriented polypropylene films can meet the requirements that water-based inks can direct print on.

The object of the present invention is to provide a biaxially oriented polypropylene film on which water-based inks can be directly printed. The quality of the biaxially oriented polypropylene film of the present invention is suitable for the print of water-based inks, heat-sealing or non-heat-sealing electroplating products.

The additives used in this application are illuminated below:

(1) Polypropylene Homopolymers
  a) MFI (Melting Flow Index) 2–5
  The homopolymer whose MFI is less than 2 is difficult for processing with poor fluidity.
  The homopolymer whose MFI is greater than 5 is poor in strength in spite of good formability.
  b) I.I (Isotactic Index) 94%–99%
  The temperature range suitable for processing the homopolymers whose isotatic index is greater than 99% is too narrow.
  The rigidity of the homopolymers whose isotatic index is than 94% is very poor.

2) Antiblocking Agents
  The particles used in the present invention are the particles whose average diameters are less than 4 μm. The particles whose diameters are greater than 4 μm are too rough to ruin the quality of print or electroplating. The amount of addition is 0.05% to 4% by weight.

3) Antistatic Agents
  The effect of addition of antistatic agents is to improve the quality of print and the facility of print. The antistatic agents used in the biaxially oriented polypropylene films of the present invention include biethoxylated amines, esterificated ethoxylated amines and glycerol monostearates.

2. Thermal-sealable Films for Electroplating
  1) The raw materials of heat-sealing films such as polypropylene homopolymers, polypropylene copolymers and antiblocking agents contain no calcium monostearate or migratable additives. Since these migratable additives will migrate to the surface of the polypropylene homopolymers or polypropylene copolymers, the adherence between polypropylene films and aluminum foils after electroplating treatments becomes weak.

(2) Polypropylene Homopolymers
  In addition to the requirements of the (1), other requirements of polypropylene homopolymers are identical to those of polypropylene homopolymers used for water-based inks.

3) Antiblock Agents
  In addition to the requirements of the (1), other requirements of antiblock agents are identical to those of antiblock agents used for water-based inks.

(4) Polypropylene Copolymers
  The MFI of the copolymers of ethylene and propylene or copolymers of propylene, ethylene and butene ranges from 4–9. The melting points of these copolymers ranges from 120–145° C. The copolymers whose MFI are less than 4 will extend abnormally. The copolymers whose MFI are greater than 9 have poor processability and easy to break when TDO (transverse direction orientation).

3. Non-heat-sealing Films for Electroplating
(1) The raw materials of non-heat-sealing films such as polypropylene homopolymers, polypropylene copolymers and antiblocking agents contain no calcium monostearate or migratable additives. Since these migratable additives will migrate to the surface of the polypropylene homopolymers or polypropylene copolymers, the adherence between polypropylene films and aluminum foils after electroplating treatments becomes weak.

(2) Polypropylene Homopolymers
  In addition to the requirements of the (1), other requirements of polypropylene homopolymers are identical to those of polypropylene homopolymers used for heat-sealing polypropylene films.

(3) Antiblocking Agents
  In addition to the requirements of the (1), other requirements of antiblock agents are identical to those of antiblock agents used for heat-sealing polypropylene films.

(4) Polypropylene Copolymers

The MFI of the copolymers of ethylene and propylene or copolymers of propylene, ethylene and butene ranges from 4–9. The melting points of these copolymers ranges from 120–145° C. The copolymers whose MFI are less than 4 will extend abnormally. The copolymers whose MFI are greater than 9 have poor processability and easy to break when TDO (transverse direction orientation).

The Processing of the Polypropylene of the Present Invention is Described Below:

The polypropylene films of the present invention are made by biaxial orientation. The polypropylene resins are heated and melted in extruders. Then the melted polypropylenes are co-extruded to form a sheet through T-shape die. The sheet is then preheated and oriented longitudinally 400% to 700% by rolls with differential speeds (1:4–1:7). Subsequently, the sheet is heated to a temperature to soften and transversally oriented 700% to 1000% by series of pinch rolls. The thickness of the biaxially oriented sheet ranges from 12–110 $\mu$m. Then one side of the biaxially oriented sheet is processed through a flame treatment. The flame treatment here means a treatment by passing the sheet on cooling rolls, and heated the sheet by 3–10 mm flame produced by burning liquid natural gas (LNG) on the opposite side of cooling rolls at the same time. The energy of the surface of the sheet that flame burns on upgrades greatly through the oxidation of the surface. Therefore, the adherence between the surface of polypropylene and the water-based inks (or aluminum foils) can be enhanced greatly. The polypropylene films treated by above process has several advantages. The surface tension of the polypropylene films treated by above process is very strong and stable for a long time. The planarity of the polypropylene films treated by above process is also high. These advantages of the polypropylene films of the present invention permit printing thereon by water-based inks or by electroplating.

The preferred conditions of the flame treatment of the films of the present invention are the flame are illustrated following.

1. Fuel Gas:

The content of methane in the LNG used for flame treatment is greater 85%. Polarized functional groups such as —NH$_2$, —CO forms on the surface of the polypropylene films after flame treatment. The higher the content of methane in the LNG fuel is, the more the functional groups such as —NH$_2$, —CO forms. Since the functional groups such as —NH$_2$, —CO formed on the surface of the polypropylene films help to improve the binding force of the surface, a great number of the functional groups such as —NH$_2$, —CO formed on the surface of the polypropylene films improve the adherence between the polypropylene and water-based inks (or electroplating aluminum foils) a lot. The preferred content of the mathane in the LNG fuel used for flame treatment is greater 85%.

2. Polarizing Voltage:

Adequate polarizing voltages ranges from 0.1–0.8 KV. The most preferred voltage is 0.2 KV.

The sheets will be too slippery to wrap as the polarizing voltage is less than 0.1 KV. The sheets will show backside treatment with poor quality of sheets as the polarizing voltage is greater than 0.8 KV.

3. The Temperatures of the Cooling Rolls:

The preferred temperature of the cooling rolls ranges from 20–50° C. Drops of water form on rolls as the temperature of cooling rolls is lower than 20° C. This results in poor quality of sheets. No cooling effect can be observed as the temperature of cooling rolls is higher than 50° C.

4. The Temperature of Flame

The preferred temperature of the flame ranges from 700–900°C. The surface tension of the sheets is relatively low and the adherence between polypropylene sheets and water-based inks (or aluminum foils) become poor as the temperature of flame is lower than 700° C. This results in poor quality of sheets. Serious abnormal wrinkles generate as the temperature of the flame is higher than 900° C.

More detailed examples are used to illustrate the present invention, and these examples are used to explain the present invention. The examples below, which are given simply by way of illustration, must not be taken to limit the scope of the invention.

EXAMPLE 1

The main extruder was fed with a first mixture of polypropylene. The first mixture of polypropylene contains 94% by weight of polypropylene homopolymer (MFI 2.7, I.I 96%) and 6% of polypropylene particles containing 12% by weight of anti-static agent. Then a second mixture of polypropylene was fed to first auxiliary extruder. The second mixture of polypropylene contains 92% by weight of polypropylene homopolymer (MFI 3.0, I.I 96%) and 8% by weight of polypropylene particles containing 2% by weight of anti-adherent agent, wherein the average diameter of the polypropylene particles is 3 $\mu$m. Then a third mixture of polypropylene was fed to a second auxiliary extruder. The third mixture of polypropylene contains 90% by weight of polypropylene homopolymer (MFI 3.0, I.I 96%) and 10% by weight of polypropylene particles containing 2% by weight of organic or inorganic anti-adherent agent, wherein the average diameter of the polypropylene particles is 2 $\mu$m. The polypropylenes were blended in the extruders and co-extruded to form a three-layer laminate through a T-shape die at a temperature ranging from 200 to 280° C. The laminate was cooled to form a sheet having temperature ranging from 15 to 60° C. by cooling cylinders. The sheet was heated to a temperature ranging from 130 to 155° C., and stretched 550% longitudinally. Then the sheet was heated to a temperature ranging from 150–190° C., and stretched 900% traversly. The oriented sheet was annealed and cooled. Then the surface of the oriented sheets was treated with a flame. A sheet of polypropylene with good adherence to water-based inks and with a thickness of 30 or 50 $\mu$m is obtained.

COMPARATIVE EXAMPLE 1

The Polypropylene Sheet for Oily Inks of Prior Arts

The main extruder was fed with a conventional first mixture of polypropylene. The conventional first mixture of polypropylene contains 97% by weight of polypropylene homopolymer (MFI 2.7, I.I 96%) and 3% of polypropylene particles containing 12% by weight of anti-static agent. Then a conventional second mixture of polypropylene was fed to two auxiliary extruders. The conventional second mixture of polypropylene contain 98% by weight of polypropylene homopolymer (MFI 2.7, I.I 96%) and 2% by weight of polypropylene particles containing 5% by weight of anti-adherent agent, wherein the average diameter of the polypropylene particles is 4.5 $\mu$m. The polypropylenes were blended in the extruders and co-extruded to form a three-layer laminate through a T-shape die at a temperature ranging from 200 to 280° C. The laminate was cooled to form a sheet having a temperature ranging from 15 to 60° C. by cooling cylinders. The sheet was heated to a temperature ranging from 130 to 155° C., and stretched sheet 550% longitudinally. Then the sheet was heated to a temperature ranging from 150–190° C., and stretched 900% traversly. The oriented sheet was annealed and cooled. Then one surface of the oriented sheets treated with corona. A sheet of polypropylene with good adherence to oily inks and with a thickness of 30 or 50 μm is obtained. The properties of the polypropylene obtained in example 1 and comparative example 1 are listed in table 1.

TABLE 1

| Properties | Example 1 | | Comparative Example 1 | |
| --- | --- | --- | --- | --- |
| Wetting tension | 30 μm | 50 μm | 30 μm | 50 μm |
|  | 46 | 48 | 38 | 38 |
| Gloss 60° | 0.6 | 0.7 | 0.9 | 1.0 |
| Abrasion factor | 200 | 200 | 195 | 190 |
| Surface resistance | 0.39 | 0.31 | 0.38 | 0.32 |
| Tension (ASTMD882) | | | | |
| MD | 16 | 14 | 15 | 14 |
| CD | 30 | 28 | 30 | 27 |
| Extension % (ASTMD882) | | | | |
| MD | 158 | 208 | 160 | 210 |
| CD | 60 | 55 | 65 | 58 |

EXAMPLE 2

The main extruder was fed with polypropylene homopolymers (MFI 3.0, I.I 96%) which contains non-migrating additives or calcium stearate. Another mixture of polypropylene was fed to first auxiliary extruder. The mixture of polypropylene that was fed to first auxiliary extruder contains 96% by weight of polypropylene homopolymer (MFI 7, I.I 96%) and 4% of polypropylene particles containing 5% by weight of non-migrating anti-adherent agent and calcium stearate, wherein the average diameter of the polypropylene particles is 3 μm. Another mixture of polypropylene was fed to second auxiliary extruder. The mixture of polypropylene that was fed to second auxiliary extruder contains 95% by weight of polypropylene homopolymer (MFI 3.0) and 5% of polypropylene particles containing 5% by weight of non-migrating anti-adherent agent and calcium stearate, wherein the average diameter of the polypropylene particles is 2 μm. The polypropylenes were blended in the extruders and co-extruded to form a three-layer laminate through a T-shape die at a temperature ranges from 200 to 280° C. The laminate was cooled to form a sheet having temperature ranging from 15 to 60° C. by cooling cylinders. The sheet was heated to a temperature ranging from 130 to 155° C., and stretched 550% longitudinally. Then the sheet was heated to a temperature ranging from 150–190° C., and stretched 900% traversly. The oriented sheet was annealed and cooled. Then the surface of the oriented sheets treated with a flame. A sheet of polypropylene with good adherence to aluminum foils and with a thickness of 20 μm is obtained.

COMPARATIVE EXAMPLE 2

The Heat-sealing Polypropylene Sheet of Prior Arts

The main extruder was fed with 100% polypropylene homopolymers (MFI 2.7, I.I 96%). The first auxiliary extruder was fed with another mixture of polypropylene. The mixture of polypropylene fed to first auxiliary extruder contains 98% by weight of polypropylene homopolymer (MFI 7) and 2% of polypropylene particles containing 5% by weight of antiadherent agent, wherein the average diameter of the polypropylene particles is 4.5 μm. Then another mixture of polypropylene was fed to second auxiliary extruder. The mixture of polypropylene that was fed to second auxiliary extruder contains 98% by weight of polypropylene homopolymer (MFI 2.7, I.I 96%) and 2% of polypropylene particles containing 5% by weight of non-migrating anti-adherent agent and calcium stearate, wherein the average diameter of the polypropylene particles is 4.5 μm. The polypropylenes were blended in the extruders and co-extruded to form a three-layer laminate through a T-shape die at a temperature ranging from 200 to 280° C. The laminate was cooled to form a sheet having temperature ranging from 15 to 60° C. by cooling cylinders. The sheet was heated to a temperature ranging from 120 to 155° C., and stretched 550% longitudinally. Then the sheet was heated, and stretched the sheet traversly. The oriented sheet was annealed and cooled. Then one of the surface of the oriented sheets treated with corona. A sheet of polypropylene suitable for electroplating and with a thickness of 30 or 50 μm is obtained. The properties of the polypropylene obtained in example 2 and comparative example 2 are listed in table 2.

EXAMPLE 3

The Non-heat-sealing Polypropylene Sheet for Electroplating

The procedure and the polypropylene mixtures are as same as those in example 2 except the mixture of polypropylene fed to first auxiliary extruder contains 96% by weight of polypropylene homopolymer (MFI 3.0, I.I=96%, and containing non-migrating anti-adherent agent and calcium stearate) and 4% of polypropylene particles containing 5% by weight non-migrating anti-adherent agent and calcium stearate, wherein the average diameter of the polypropylene particles is 3 μm. A sheet of polypropylene suitable for electroplating and with a thickness of 30 μm is obtained. The properties of the polypropylene obtained in example 3 and comparative example 3 are listed in table 2.

COMPARATIVE EXAMPLE 3

The Non-heat-sealing Polypropylene Sheet of Prior Arts

The procedure and the polypropylene mixtures are the same as those in comparative example 2 except the mixture of polypropylene fed to first auxiliary extruder contains 98% by weight of polypropylene homopolymer (MFI 2.7, I.I= 96%) and 2% of polypropylene particles containing 5% by weight of antiadherent agent, wherein the average diameter of the polypropylene particles is 4.5 μm. A sheet of polypropylene suitable for electroplating and with a thickness of 30 or 50 μm is obtained. The properties of the polypropylene obtained in example 3 and comparative example 3 are listed in table 2.

TABLE 2

| properties | Example 2 20 μm | Example 3 30 μm | Comparative Example 20 μm | Comparative Example 3 30 μm |
|---|---|---|---|---|
| Wetting tension | 40 | 42 | 33 | 33 |
| Gloss 60° | 720 | 720 | 750 | 760 |
| Abrasion factor | 0.5 | 0.4 | 0.4 | 0.4 |
| Optical density | 2.0 | 2.0 | 2.0 | 2.0 |
| The adherence between aluminum foils and sheets | aluminum foils don't come off | aluminum foils don't come off | aluminum foils come off | Aluminum foils come off |
| The adherence strength between electroplating surface and other plastics | 140 | 140 | 60 | 60 |
| Sealing temperature | 125 | — | 125 | — |
| Tension strength (ASTMD882) | | | | |
| MD | 16 | 14 | 15 | 15 |
| CD | 33 | 27 | 32 | 28 |
| Extension % (ASTMD882) | | | | |
| MD | 170 | 165 | 165 | 170 |
| CD | 55 | 55 | 55 | 65 |

The Effect of the Present Invention:
1. The wetting tension of the biaxially oriented polypropylene fabricated through the process described in the present invention is better than that of the common polypropylene for coating of oily inks. The surface tension of the biaxially oriented polypropylene fabricated through the process described in the present invention is high and the adherence between water-based inks and the biaxially oriented polypropylene of the present invention is excellent. Therefore, the biaxially oriented polypropylene fabricated through the process of the present invention is adequate for printing of water-based inks.
2. The adherence between water-based inks and common polypropylene for printing of oily inks is poor because the wetting tension of the common polypropylene is low. Therefore, the water-based inks easily fall off after printing and abnormal coloring appears for some colors.
3. The adherence of aluminum foils and the biaxially oriented polypropylene fabricated through the process of the present invention is tested by pasting a cellulose tape on the aluminum foils first and tearing off the cellulose tape later. The result shows that the aluminum foils have good adherence and don't fall off from the biaxially oriented polypropylene fabricated through the process of the present invention.
4. The adherence between the elctroplating aluminum foils and the biaxially oriented polypropylene fabricated through the process of the present invention is good because the polypropylene of the present invention contains no migrating additive.

Besides, the adherence of the biaxially oriented polypropylene of the present invention and other plastic is good. Therefore, the biaxially oriented polypropylene fabricated through the process of the present invention is adequate for application of electroplating products.

What is claimed is:

1. A process for manufacturing biaxially oriented polypropylene film for water-based ink print, comprising:
    feeding a first mixture of polypropylene to a main extruder,
        said first mixture of polypropylene containing 99.5–92.5% by weight of polypropylene homopolymer (MFI 2–5, I.I 94–99%) and 0.5–7.5% of polypropylene particles containing 8–30% by weight of at least one anti-static agent selected from the group consisting of diethoxylamine, esterified ethoxylamine and monosteryl glycerate;
    feeding a second mixture of polypropylene to a first auxiliary extruder, said second mixture of polypropylene containing 97.5%–80% by weight of polypropylene homopolymer (MFI 2–5, I.I 94–99%) and 2.5–20% by weight of polypropylene particles containing 2–10% by weight of organic or inorganic anti-adherent agent, wherein the average diameter of the polypropylene particles is less than 4 μm;
    feeding a third mixture of polypropylene to a second auxiliary extruder, said third mixture of polypropylene containing 97.5–80% by weight of polypropylene homopolymer (MFI 2–5, I.I 94–99%) and 2.5–20% by weight of polypropylene particles containing 2–10% by weight of organic or inorganic anti-adherent agent, wherein the average diameter of the polypropylene particles is less than 4 μm;
    co-extruding the three mixtures of polypropylene through a T-shape die at an extruding temperature ranging from 200 to 280° C. to form a laminate wherein said laminate includes a lamina of said first polypropylene mixture, a lamina of said second polypropylene mixture and a lamina of said third polypropylene mixture;
    cooling said laminate to a temperature ranging from 15 to 60° C. to form a sheet;
    heating said sheet to a temperature ranging from 130 to 155° C. to form a heated sheet;
    initially stretching said heated sheet 400% to 700% unaxially;
    cooling said heated sheet to form a cooled sheet;
    heating said cooled sheet to a temperature ranging from 150–190° C. to form a reheated sheet;
    stretching said reheated sheet 700% to 1000% in a direction perpendicular to said initial stretching to form a biaxially-stretched sheet;
    cooling said biaxially stretched sheet; and
    treating said biaxially stretched sheet with a flame produced by combusting liquid natural gas (L.N.G.) and having a flame temperature ranging from 700–900° C., wherein said liquid natural gas contains more than 85% of methane and the thickness of said biaxially-stretched sheet ranges from 12–110 μm.

2. A process for manufacturing thermal-sealable biaxially oriented polypropylene film for electroplate, comprising:

feeding a first mixture to a main extruder, said first mixture comprising polypropylene homopolymer (MFI 2–5, I.I 94–99%) and non-migrating additives or calcium stearate;

feeding a second mixture to a first auxiliary extruder, said second mixture comprising 99–92% by weight of polypropylene homopolymer (MFI 4–9, melting point 120–145° C.) and 2–10% of polypropylene particles containing 1–8% by weight of non-migrating anti-adherent agent and calcium stearate, wherein the average diameter of the polypropylene particles is less than 4 μm;

feeding a third mixture to a second auxiliary extruder, said third mixture comprises 99–92% by weight of polypropylene homopolymer (MFI 2–5, I.I 94–99% ) and 2.5–20% by weight of polypropylene particles containing 2–10% by weight of organic or inorganic anti-adherent agent, wherein the average diameter of the polypropylene particles is less than 4 μm;

co-extruding the three mixtures through a T-shape die at an extruding temperature ranging from 200 to 280° C. to form a laminate wherein said laminate includes a lamina of said first mixture, a lamina of said second mixture and a lamina of said third mixture;

cooling said laminate to a temperature ranging from 15 to 60° C. to form a sheet;

heating said sheet to a temperature ranging from 120 to 155° C. to form a heated sheet;

initially stretching said heated sheet 400% to 700% unaxially;

cooling said heated sheet to form a cooled sheet;

heating said cooled sheet to a temperature ranging from 150–190° C. to form a reheated sheet;

stretching said reheated sheet 700% to 1000% in a direction perpendicular to said initial stretching to form a biaxially-stretched sheet;

cooling said biaxially-stretched sheet; and treating said biaxially stretched sheet with a flame produced by combusting liquid natural gas (L.N.G.) and having a flame temperature ranging from 700–900° C., wherein said liquid natural gas contains more than 85% of methane and the thickness of said biaxially-stretched sheet ranges from 12–110 μm.

3. A process for manufacturing non-thermal-sealable biaxially oriented polypropylene film for electroplate, comprising:

feeding a first mixture to a main extruder, said first mixture comprising polypropylene homopolymer (MFI 2–5, I.I 94–99%) and non-migrating additives or calcium stearate;

feeding a second mixture to a first auxiliary extruder, said second mixture comprising 99–92% by weight of polypropylene homopolymer (MFI 2–5, melting point 120–145° C.) and 2–10% of polypropylene particles containing 1–8% by weight of non-migrating anti-adherent agent and calcium stearate, wherein the average diameter of the polypropylene particles is less than 4 μm;

feeding a third mixture to a second auxiliary extruder, said third mixture comprising 99–92% by weight of polypropylene homopolymer (MFI 2–5, I.I 94–99% ) and 2.5–20% by weight of polypropylene particles containing 2–10% by weight of organic or inorganic anti-adherent agent, wherein the average diameter of the polypropylene particles is less than 4 μm;

co-extruding the three mixtures through a T-shape die at an extruding temperature ranging from 200 to 280° C. to form a laminate wherein said laminate includes a lamina of said first mixture, a lamina of said second mixture and a lamina of said third mixture;

cooling said laminate to a temperature ranging from 15 to 60° C. to form a sheet;

heating said sheet to a temperature ranging from 120 to 155° C. to form a heated sheet;

initially stretching said heated sheet 400% to 700% unaxially;

cooling said heated sheet to form a cooled sheet;

heating said cooled sheet to a temperature ranging from 150–190° C. to form a reheated sheet;

stretching said reheated sheet 700% to 1000% in a direction perpendicular to said initial stretching to form a biaxially-stretched sheet;

cooling said biaxially-stretched sheet; and treating said biaxially-stretched sheet with a flame produced by combusting liquid natural gas (L.N.G.) and having a flame temperature ranging from 700–900° C., wherein said liquid natural gas contains more than 85% of methane and the thickness of said biaxially-stretched sheet ranges from 12–110 μm.

* * * * *